(12) United States Patent
Zhang (10) Patent No.: US 7,137,992 B2
(45) Date of Patent: Nov. 21, 2006

(54) MIND STIMULATOR

(76) Inventor: Qi Zhang, 1303 Avocado Ave., Suite 140, Newport Beach, CA (US) 92660

( * ) Notice: Subject to any disclaimer, the term of this patent is extended or adjusted under 35 U.S.C. 154(b) by 703 days.

(21) Appl. No.: 10/313,585

(22) Filed: Dec. 9, 2002

(65) Prior Publication Data

US 2004/0110114 A1 Jun. 10, 2004

(51) Int. Cl.
*A61F 7/00* (2006.01)
(52) U.S. Cl. .................. 607/110; 607/104; 607/108
(58) Field of Classification Search ............ 340/5–576; 600/544–545; 607/107, 110, 139, 149; 454/907; 180/272
See application file for complete search history.

(56) References Cited

U.S. PATENT DOCUMENTS

| 4,203,098 | A | * | 5/1980 | Muncheryan | ............... 340/575 |
|---|---|---|---|---|---|
| 5,342,411 | A | * | 8/1994 | Maxted et al. | ............... 607/107 |
| 5,450,894 | A | * | 9/1995 | Inoue et al. | ................... 165/43 |
| 6,087,942 | A | * | 7/2000 | Sleichter et al. | ............ 340/576 |
| 6,167,298 | A | * | 12/2000 | Levin | .......................... 600/545 |
| 6,297,728 | B1 | * | 10/2001 | Rippbauer | ................... 340/576 |
| 6,325,362 | B1 | * | 12/2001 | Massey et al. | ............... 261/127 |

* cited by examiner

*Primary Examiner*—Roy D Gibson
(74) *Attorney, Agent, or Firm*—Raymond Y. Chan; David and Raymond Patent Firm (57) ABSTRACT

A mind stimulator includes a head cooler, a supporting frame for adjustably supporting the head cooler above a user's head, and a cooling source, which is communicatively connected with the head cooler, adapted for transferring a cooling air through the head cooler around the user's head so as to substantially cool down a user's head temperature. Therefore, by lowering the user's head temperature, the user's mind activities are substantially increased, so as to prevent the user returning back to the drowsy condition.

11 Claims, 6 Drawing Sheets

MIND STIMULATOR

BACKGROUND OF THE PRESENT INVENTION

1. Field of Invention

The present invention relates to human's mind activities, and more particularly to a mind stimulator, which is capable of substantially cooling down a user's head so as to effectively increase the user's mind activities without hazarding the user's health.

2. Description of Related Arts

Many people have an experience that they keep yawning and almost fall asleep during driving. In order to prevent people falling asleep during driving, they either drink coffee as a stimulant or wind down the window to the wind blow into the vehicle. However, such methods are not the best solution to solve the above problem since the coffee contains caffeine that makes people uncomfortable, such as speeding up the rate of heartbeat or causing the hand shaking. In addition, it is a hassle for the passengers when the windows are opened.

In order to solve the problem that causes the people sleepy, scientists have discovered that when people are in a drowsy condition, the body temperature, especially the upper head portion, will be raised. Once the body temperature is raised, the nervous system of the human's brain will start slowing down the response so that people will function sluggishly. Therefore, most drivers would like to park their vehicle aside and wash their faces to cool down the body temperature when they are sleepy. In other words, when the body temperature increases, the working efficiency will be reduced.

Furthermore, the regulating system of the human being cannot automatically cool down the body temperature while the body temperature is raised again. Therefore, people will tend to return to the drowsy condition again such that they must repeatedly wash their faces to keep them awake.

SUMMARY OF THE PRESENT INVENTION

A main object of the present invention is to provide a mind stimulator which is capable of substantially cooling down a user's head so as to effectively increase the user's mind activities without hazarding the user's health.

Another object of the present invention is to provide a mind stimulator, which can keep the air surrounding the user's head in cooling condition to prevent the body temperature of the user's head from raising again so as to avoid the user returning back to the drowsy condition.

Another object of the present invention is to provide a mind stimulator, which can installed into any kind of vehicle having an air conditioning system, such that the air conditioning system of the vehicle functions as a cooling agent for the mind stimulator to provide cooling air towards the user's head via the mind stimulator.

Another object of the present invention is to provide a mind stimulator, which can be deliver the cooling air towards the user's head even though the mind stimulator does not hook up to the air conditioning system of the vehicle.

Another object of the present invention is to provide a mind stimulator, wherein the operation of the mind stimulator is simple that every individual is able to operate the mind stimulator without complicated instruction.

Another object of the present invention is to provide a mind stimulator, wherein no expensive or complicated structure is required to employ in the present invention in order to achieve the above mentioned objects. Therefore, the present invention successfully provides an economic and efficient solution for providing a temperature control to cool down the user's head so as to retain the user's mind in an active manner.

Accordingly, in order to accomplish the above objects, the present invention provides a mind stimulator, which comprises:

a head cooler;

means for adjustably supporting the head cooler above a user's head; and a cooling source, which is communicatively connected with the head cooler, adapted for transferring a cooling agent to provide a cooling air through the head cooler around the user's head so as to substantially cool down a user's head temperature.

DETAILED DESCRIPTION OF THE PREFERRED EMBODIMENT

Figure 1:
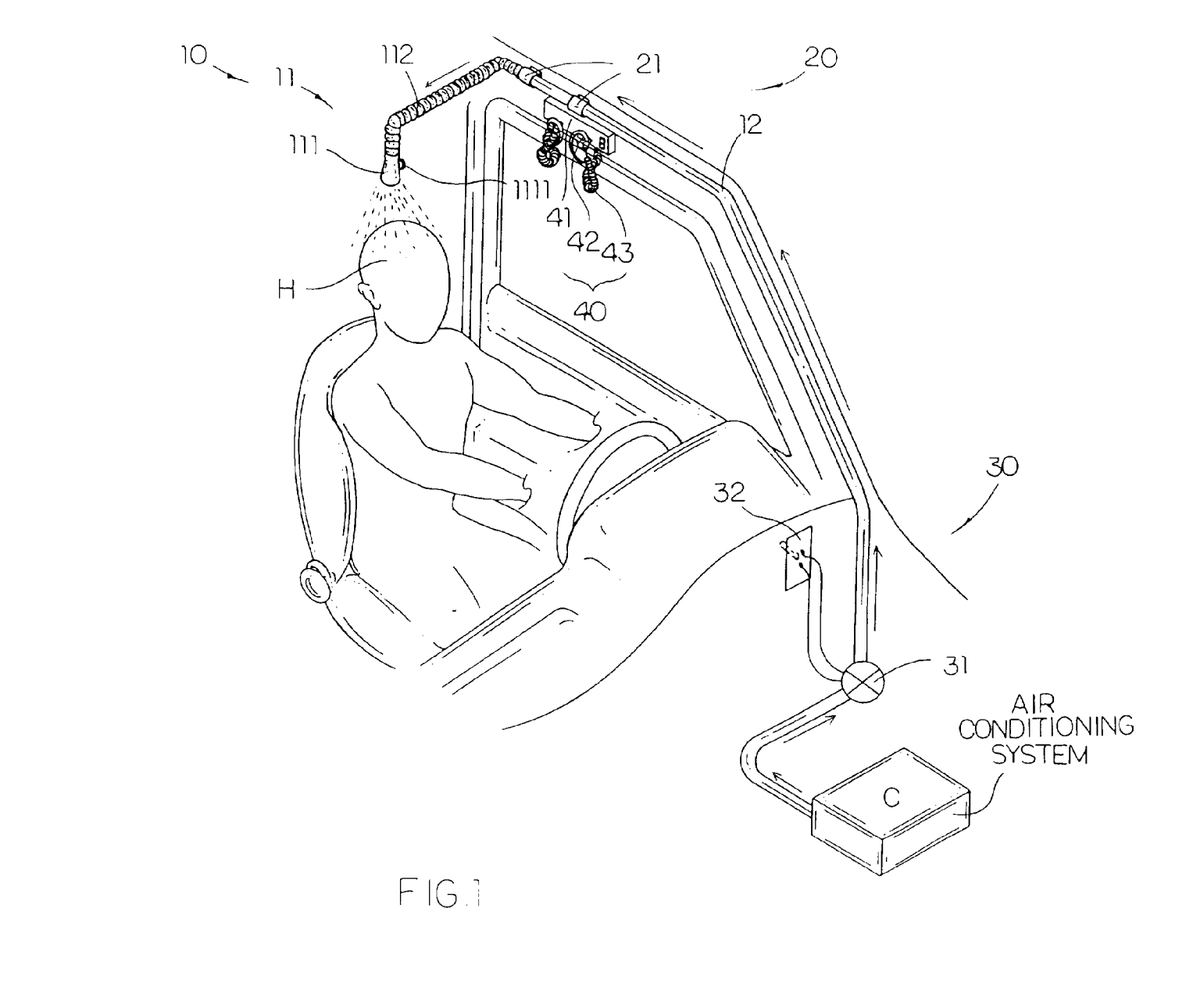
FIG. 1 is a perspective view of a mind stimulator installed into a vehicle according to a first preferred embodiment of the present invention.

Referring to FIG. 1 of the drawings, a mind stimulator installed into a vehicle according to a first preferred embodiment of the present invention is illustrated, wherein the mind stimulator comprises a head cooler 10, means 20 for adjustably supporting the head cooler 10 above a user's head H when the user sits in the vehicle, and a cooling source 30, which is communicatively connected with the head cooler 10, adapted for transferring a cooling agent C to provide a cooling air through the head cooler 10 around the user's head H so as to substantially cool down a user's head temperature.

Figure 2:
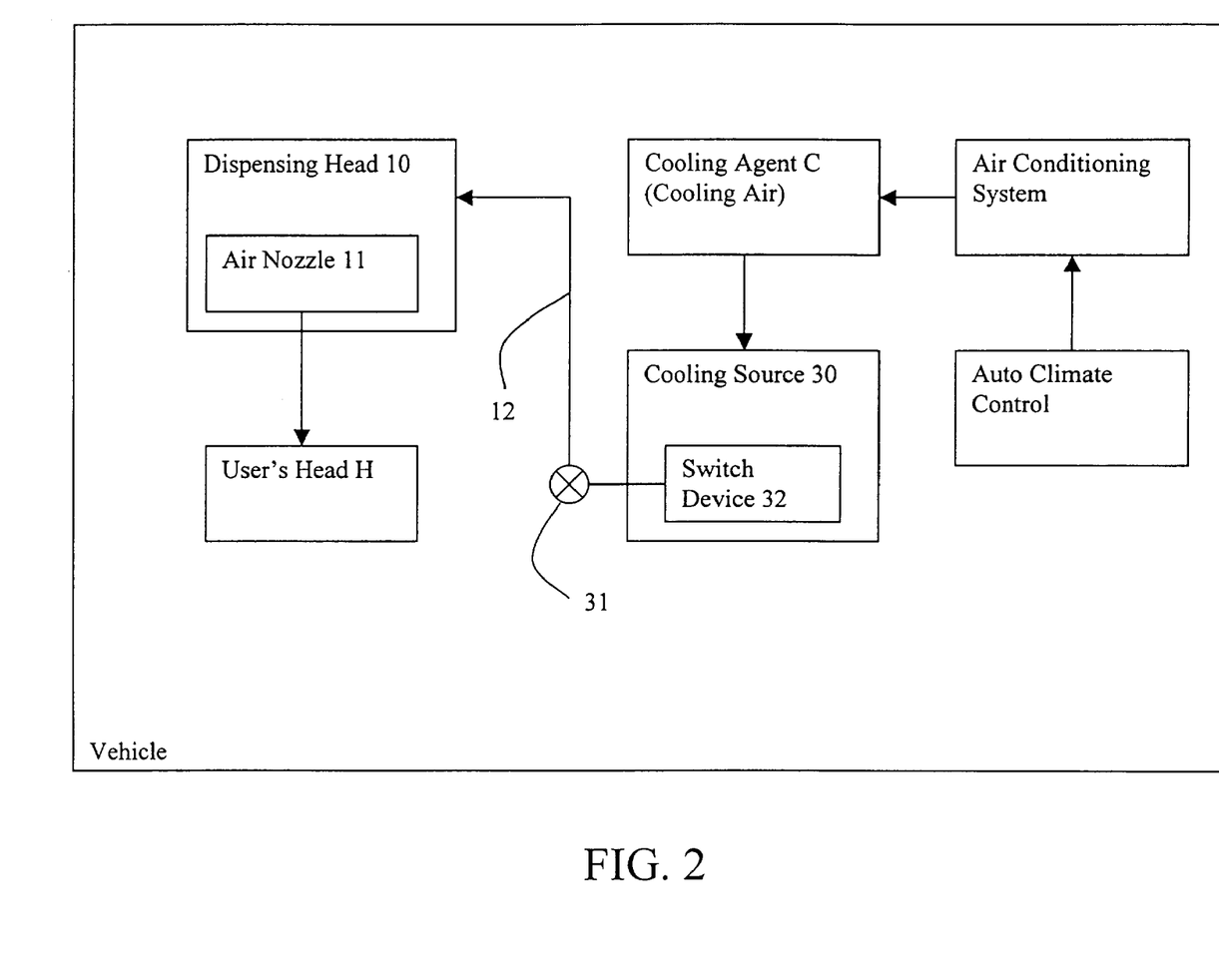
FIG. 2 is a block diagram of the mind stimulator incorporated with an air conditioning system of the vehicle according to the above first preferred embodiment of the present invention.

According to the preferred embodiment, the mind stimulator is adapted for installing into a vehicle to incorporate with an air conditioning system of the vehicle, as shown in FIG. 2, so as to transferring the cooling air as the cooling agent C from the air conditioning system of the vehicle directly towards the user's head H.

The head cooler 10 comprises at least an air nozzle 11 and an air conduct 12 extended from the air nozzle 11 to the cooling source 30 in such a manner that the cooling air is allowed to pass through the air conduct 12 to the air nozzle 11 and is directly blew towards the user's head H.

The supporting means 20 comprises a plurality of mounting elements 21 spacedly mounted the air conduct 12 with respect to an interior wall of the vehicle in such a manner that the air nozzle 11 is suspendedly supported above the user's head H. Accordingly, each of the mounting elements 21 is a U-shaped mounting clip for the air conduct 12 passing through while two end portions of the mounting element 21 adapted for securely attaching to the interior wall of the vehicle so as to retain the air conduit 12 in position.

The cooling source 30 is adapted for connecting with the air conditioning system of the vehicle and arranged in such a manner that when the air conditioning system is switched on to produce the cooling air, a portion of the cooling air is detoured by the cooling source 30 to the air nozzle 11 through the air conduct 12.

The cooling source 30 comprises a regulating valve 31 mounted to the air conduit 12 of the head cooler 10 and a switch device 32 operatively connected to the regulating valve 31 to control the regulating valve 31 in an opened and closed manner wherein when the regulating valve 31 is switched to open via the switch device 32, the cooling air from the conditioning system is directed to flow towards the air nozzle 11 through the air conduct 12, and when the regulating valve 31 is switched to closed via the switch device, the cooling air is blocked from discharging towards the air nozzle 11.

It is worth mentioning that the vehicle comprises an auto climate control incorporated with the air conditioning system for controlling a temperature of the cooling air. Therefore, the temperature of the cooling air discharging from the air nozzle 11 can be preset by controlling the auto climate control. Preferably, the temperature of the cooling air is preset at a range between 60° C. to 70° C. as an optimism temperature to effectively cool down the user's head H.

Figure 3:
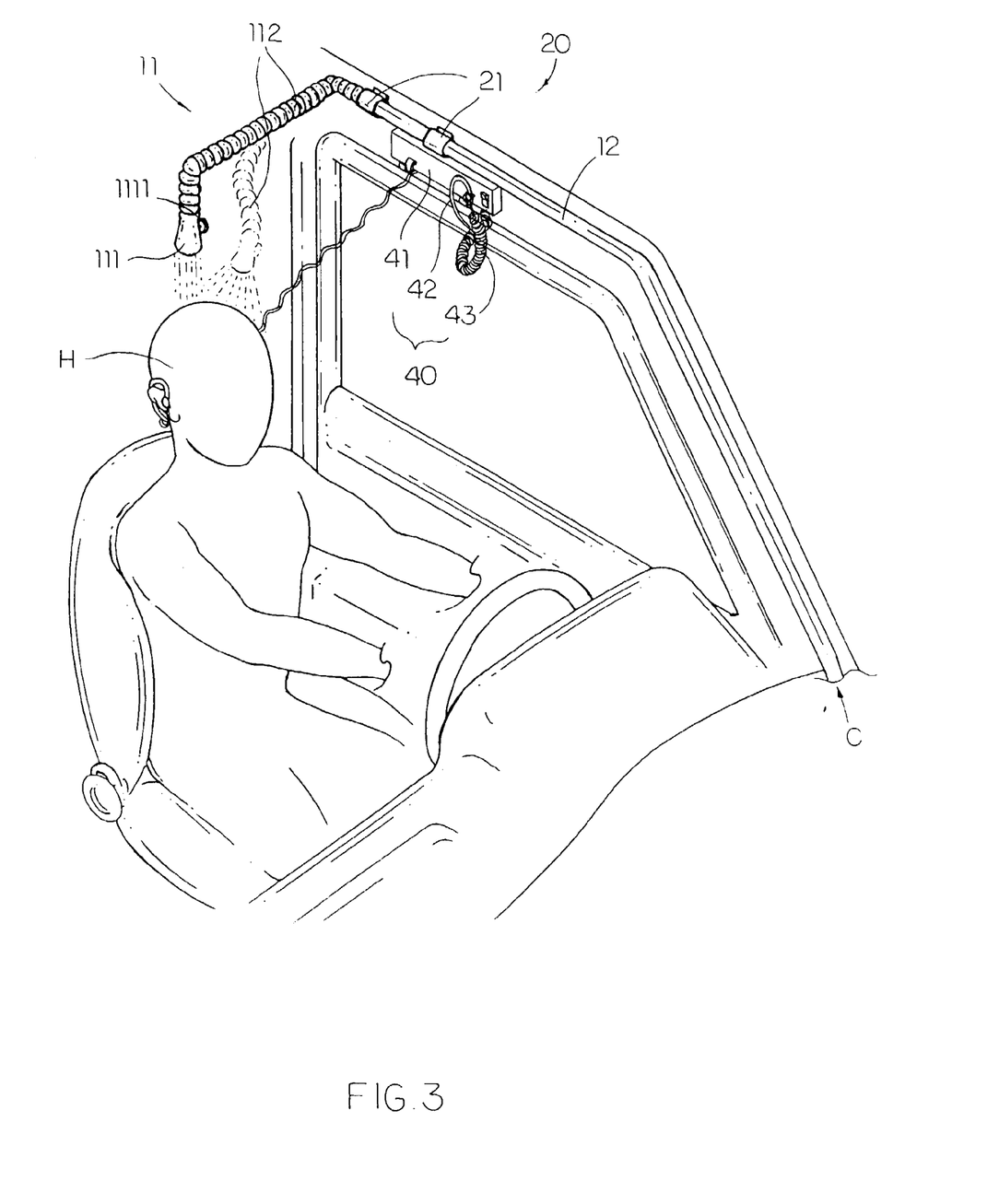
FIG. 3 is a perspective view of a head cooler of the mind stimulator according to the above first preferred embodiment of the present invention.

As shown in FIG. 3, the air nozzle 11 comprises a nozzle head 111 and a flexible nozzle arm 112 extended from the air conduct 12 to the nozzle head 111 wherein the flexible nozzle arm 112 is capable of selectively bending to adjust a position of the nozzle head 111 pointing to the user's head H.

Moreover, the nozzle head 111 comprises means 1111 for adjusting a form of the cooling air discharging from the nozzle head 111. The adjusting means 1111 is embodied as control knob rotatably mounted to the nozzle head 111 to adjust a size of an outlet of the nozzle head 111. Therefore, the user is able to select the cooling air discharging from the nozzle head 111 in a shower form to enlarge the cooling area around the user's head or in a propel form to directly blowing the cooling air on a predetermined portion of the user's head H.

It is worth mentioning that when the user is in a drowsy condition, the top portion of the user's head has the highest temperature. Therefore, the user is able to adjust the nozzle head 111 to discharge the cooling air in the propel form so as to direct the cooling air right on the top portion of the user's head H to achieve the cooling effect. Then, after the user's head H is cooled down, the user is able to adjust the nozzle head 111 to discharge the cooling air in the shower form to keep the cooling air around the user's head H so as to prevent the user returning back to the drowsy condition.

In addition, the user is able to adjust the position of the nozzle head 111 by bending the nozzle arm 112 so as to select the particular portion of the user's head H that the cooling air is discharged thereto. Accordingly, the optimum areas that the nozzle head 111 should be pointed thereto are the top portion and two side portions of the user's head H respectively.

As shown in FIGS. 1 and 3, the mind stimulator further comprises an ear stimulator 40 mounted at a position above the user's head H, wherein the ear stimulator 40 comprises a power control 41 supported by the supporting means 20 and two ear stimulating pieces 42 electrically extended from the power control 41 via two retractable wires 43 respectively for detachably mounting on the user's ears respectively in such a manner that each of the ear stimulating pieces 42 is adapted for stimulating the nervous system at the respective ear of the user so as to arouse the user simultaneously.

It is worth to mention that there are thousands of nerves located at the human ear, which are intensively effected on the internal organs and on other parts of the body. Therefore, when the user is in a drowsy condition, he or she may simply rub his or her ears to stimulate the nervous system for arousing the user.

According to the preferred embodiment, the ear stimulating pieces 42 are adapted for detachably mounting on the user's ears respectively and arranged to stimulate the nerve around the user's ears by means of vibration or electric impulse.

Figure 4:
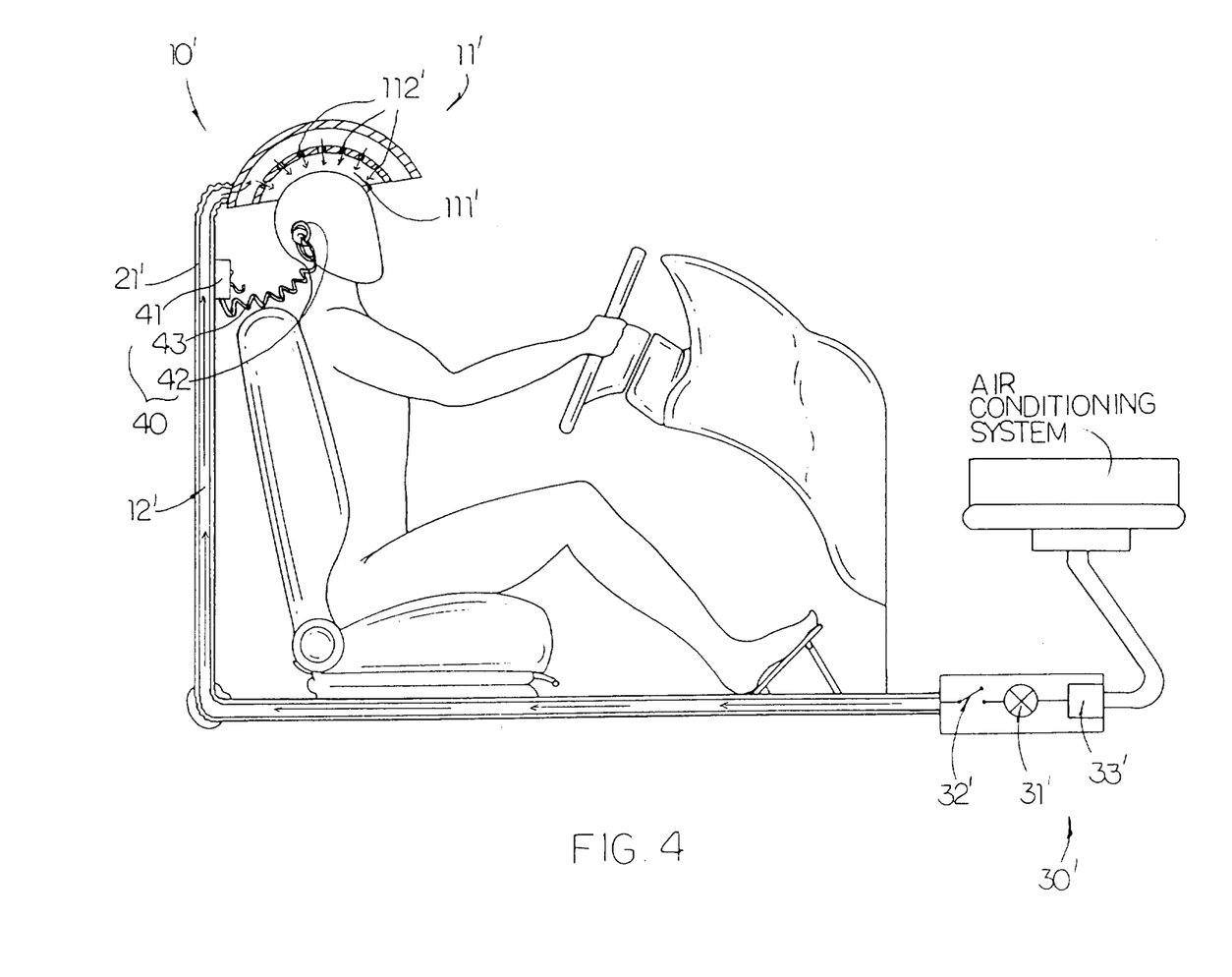
FIG. 4 illustrates an alternative mode of the head cooler of the mind stimulator according to the above first preferred embodiment of the present invention.

FIG. 4 illustrates an alternative mode of the head cooler 10' which comprises a dispenser cap 11' having a dispensing cavity 111' and a plurality of air meshes 112' spacedly formed on an inner wall of the dispensing cavity 111' for communicating with the air conduit 12', wherein the dispenser cap 11' is adapted for being suspendedly supported above the user's head H at a position that the top portion of the user's head H is positioned within the dispensing cavity 111' in such a manner that the cooling air flowing from the air conduit 12' is evenly dispensed on the top portion of the user's head H through the air meshes 112'.

Moreover, the supporting means 20' comprises a supporting shaft 21' adapted for mounting behind a car seat of the vehicle wherein the head cooler 10' is suspendedly and movably supported by the supporting shaft 21' at a position above the user's head H. The supporting shaft 21' has a hollow chamber 211' for the air conduct 12' passing through in such a manner that the air conduit 12' is extended from the cooling source 30' to the head cooler 10' through the supporting shaft 21'.

The cooling source 30' further has a cooling agent compartment 33' for receiving the cooling agent C, in such a manner that when the regulating valve 31' is switched to open via the switch device 32', the ambient air is flowing into the cooling agent compartment 33' so as to convert the ambient air into the cooling air via the cooling agent C to discharge at the head cooler 10'. It is worth mentioning that the user is able to turn on the fan of the vehicle only to direct the ambient air into the cooling agent compartment 33' without switching on the air conditioning system of the vehicle. In other words, even though some vehicles do not have the air conditioning system or the air conditioning system is not functioning, the mind stimulator of the present invention is capable of delivering the cooling air towards the user's head in order to keep the user awake.

Accordingly, the cooling agent C can be a cooling gel or ice that adapted to cool down the ambient air so as to turn the ambient air into the cooling air.

Figure 5:
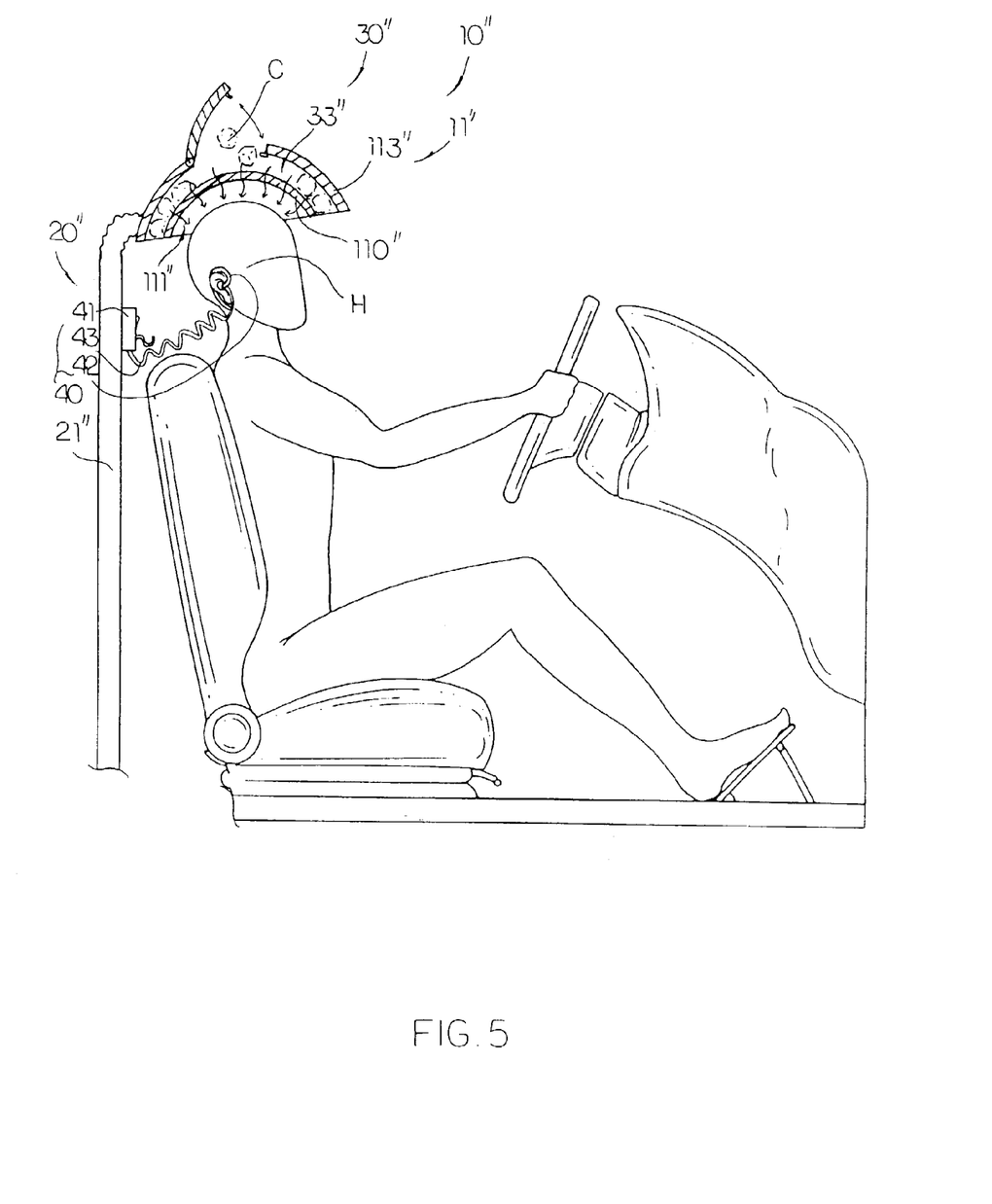
FIG. 5 illustrates an alternative mode of the mind stimulator incorporated with the cooling agent according to the above first preferred embodiment of the present invention.

FIG. 5 illustrates an alternative mode of the mind stimulator wherein the mind stimulator dose not required to electrically connect with the air conditioning system of the vehicle. According to the preferred embodiment, the head cooler 10", which is suspendedly supported by the supporting shaft 21", comprises a dispenser cap 11" having a dispensing cavity 111" for receiving the top portion of the user's head H therewithin.

The cooling source 30" has a cooling agent compartment 33" provided on the dispenser cap 11" for receiving the cooling agent C therein so as to cool down an air within the dispensing cavity 111".

Accordingly, the dispenser head 11" comprises an inner conductive layer 110" formed as an inner wall of the dispensing cavity 111" to communicate with the cooling agent compartment 33" in such a manner that the air within the dispensing cavity 111" is condensed to become the cooling air by the cooling agent C through the conductive layer 110" while the cooling agent C is disposed in the cooling agent compartment 33".

In order to enhance the cooling process of the air within the dispensing cavity 111", the dispenser head 11" should be constructed to have a heat insulation layer 113" enclosed the cooling agent compartment 33" such that the cooling agent C in the cooling agent compartment 33" can substantially convert the air within the dispensing cavity 111" through the inner conductive layer 110" without excess energy loss.

Figure 6:
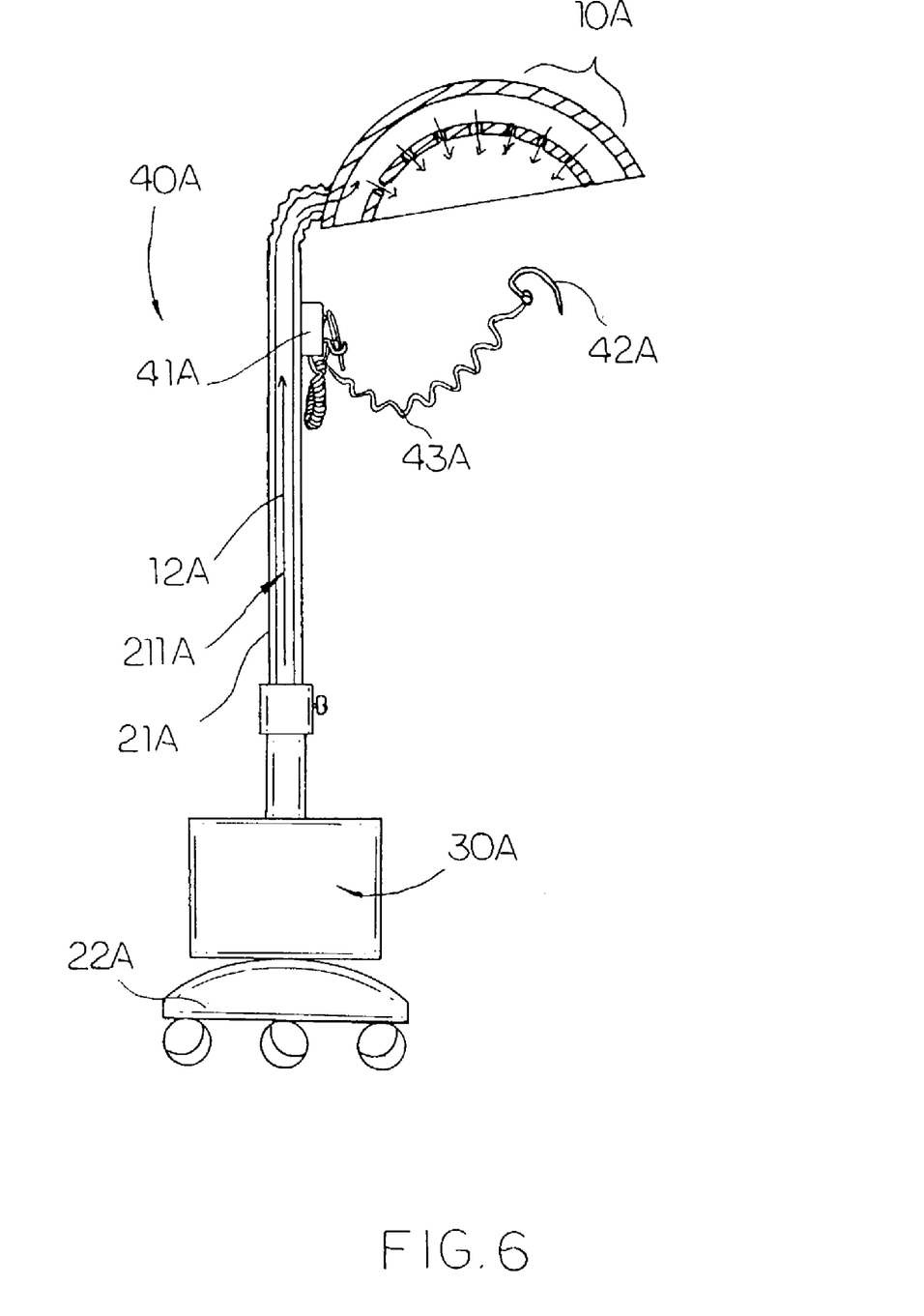
FIG. 6 is a perspective view of a mind stimulator according to a second preferred embodiment of the present invention.

As shown in FIG. 6, a mind stimulator according to a second embodiment illustrates an alternative mode of the first embodiment of the present invention, wherein the mind stimulator is constructed as a portable device which is adapted for using indoors such as in the office or home.

According to the second embodiment, the supporting means 20A comprises a standing base 22A for supporting the cooling source 30A thereon and a supporting shaft 21A upwardly extended from the standing base 22A to suspendedly and movably support the head cooler 10A above the user's head H wherein the supporting shaft 21A has a hollow chamber 211A for the air conduct 12A passing through in such a manner that the air conduit 12A is extended from the cooling source 30A to the head cooler 10A through the supporting shaft 21A for dispensing the cooling air from the cooling source 30A towards the user's head H through the head cooler 10A.

The mind stimulator further comprises an ear stimulator 40A mounted at a position above the user's head H, wherein the ear stimulator 40A comprises a power control 41A supported by the supporting means 20A and two ear stimulating pieces 42A electrically extended from the power control 41A via two retractable wires 43 respectively for detachably mounting on the user's ears respectively in such a manner that each of the ear stimulating pieces 42A is adapted for stimulating the nervous system at the respective ear of the user so as to arouse the user simultaneously.

In other words, the user is able to transport the mind stimulator anywhere such as in the office or home so as to simply set up mind stimulator to retain the user's mind in an active manner during work. In addition, the standing base 22A can be embodied as an office chair in such a manner that the supporting shaft 21A is upwardly extended from the office chair of the standing base 22A to support the head cooler 10A above the user's head during working.

Moreover, the head cooler 10A can be detachably mounted to the supporting means 20A such that the user is able to detach the head cooler 10A in the vehicle and mount to the supporting means 20A preset in the home or office, so as to broaden the use of the mind stimulator of the present invention.

Furthermore, the head cooler 10A can be embodied as a cap wherein the cooling agent is disposed in the cap of the head cooler 10A in such a manner that the user is able to wear the cap to cool down the temperature of the user's head H especially when the user is working outdoors such as hiking.

In view of above, the mind stimulator can substantially cool down the user's head temperature to effectively increase the user's mind activities so as to prevent the user falling into the drowsy condition. Since the stimulation method of the present invention is to directly cool down the body temperature of the user at the head portion thereof, the user's mind activities will be immediately enhanced once the temperature is lowered. In addition, since only the cooling air is discharged to the user's head, no drug is needed to intake in the user's body, so that the mind stimulator of the present invention will not hazard to the user's health.

What is claimed is:

1. A mind stimulator, comprising:

a head cooler;

means for adjustably supporting said head cooler above a user's head, wherein said supporting means comprises a hollow supporting shaft adapted for mounting behind a car seat of a vehicle; and a cooling source, which is communicatively connected with said head cooler adapted for transferring a cooling air through said head cooler around said user's head so as to substantially cool down a user's head temperature, wherein said head cooler comprises a dispenser cap and an air conduit extended from said dispenser cap to said cooling source, wherein said dispenser cap has a dispensing cavity for receiving a top portion of said user's head therewithin and a plurality of air meshes spacedly formed on an inner wall of said dispensing cavity for communicating with said air conduit in such a manner that said cooling air is allowed to pass from said cooling source to said dispensing cavity through said air meshes for discharging on said top portion of said user's head, wherein said head cooler is suspendedly and movably supported by said supporting shaft at a position above said user's head and arranged in such a manner that said air conduit is extended from said cooling source to the head cooler through said supporting shaft.

2. A mind stimulator, comprising:

a head cooler;

means for adjustably supporting said head cooler above a user's head, wherein said supporting means comprises a hollow supporting shaft adapted for mounting behind a car seat of a vehicle; and a cooling source, which is communicatively connected with said head cooler adapted for transferring a cooling air through said head cooler around said user's head so as to substantially cool down a user's head temperature, wherein said cooling source, which is adapted for operatively connecting with an air conditioning system of said vehicle for providing said cooling air therefrom, comprises a regulating valve mounted to said head cooler and a switch device operatively connected to said regulating valve to control said regulating valve in an opened and closed manner wherein when said regulating valve is switched to open via said switch device, said cooling air is directed to flow towards said head cooler, and when said regulating valve is switched to closed via said switch device, said cooling air is blocked from discharging towards said head cooler, wherein said head cooler comprises a dispenser cap and an air conduit extended from said dispenser cap to said cooling source, wherein said dispenser cap has a dispensing cavity for receiving a top portion of said user's head therewithin and a plurality of air meshes spacedly formed on an inner wall of said dispensing cavity for communicating with said air conduit in such a manner that said cooling air is allowed to pass from said cooling source to said dispensing cavity through said air meshes for discharging on said top portion of said user's head, wherein said head cooler is suspendedly and movably supported by said supporting shaft at a position above said user's head and arranged in such a manner that said air conduit is extended from said cooling source to the head cooler through said supporting shaft.

3. The mind stimulator, as recited in claim 2, further comprising an ear stimulator adapted to be mounted at a position above said user's head, wherein said ear stimulator comprises a power control supported by said supporting means and two ear stimulating pieces electrically extended from said power control via two retractable wires respectively for detachably mounting on said user's ears respectively in such a manner that each of said ear stimulating pieces is adapted for stimulating a nervous system at said respective ear of said user so as to arouse said user simultaneously.

4. A mind stimulator adapted to be, comprising:
a head cooler;
means for adjustably supporting said head cooler above a user's head; and
a cooling source, which is communicatively connected with said head cooler, adapted for transferring a cooling air through said head cooler around said user's head so as to substantially cool down a user's head temperature, wherein said cooling source, which is adapted for connecting with an air conditioning system of a vehicle for providing an ambient air therefrom, has a cooling agent compartment for receiving a cooling agent therein and arranged for converting said ambient air into said cooling air via said cooling agent within said cooling agent compartment, wherein said head cooler comprises a dispenser cap and an air conduit extended from said dispenser cap to said cooling source, wherein said dispenser cap has a dispensing cavity for receiving a top portion of said user's head therewithin and a plurality of air meshes spacedly formed on an inner wall of said dispensing cavity for communicating with said air conduit in such a manner that said cooling air is allowed to pass from said cooling source to said dispensing cavity through said air meshes for discharging on said top portion of said user's head, wherein said supporting means comprises a standing base to support said cooling source thereon and a supporting shaft upwardly extended from said standing base to suspendedly and movably support said head cooler above said user's head wherein said supporting shaft has a hollow chamber for said air conduit passing through in such a manner that said air conduit is extended from said cooling source to said head cooler through said supporting shaft for dispensing said cooling air from said cooling source towards said user's head through said head cooler.

5. The mind stimulator, as recited in claim 4, further comprising an ear stimulator mounted at a position above said user's head, wherein said ear stimulator comprises a power control supported by said supporting means and two ear stimulating pieces electrically extended from said power control via two retractable wires respectively for detachably mounting on said user's ears respectively in such a manner that each of said ear stimulating pieces is adapted for stimulating a nervous system at said respective ear of said user so as to arouse said user simultaneously.

6. A mind stimulator, comprising:
a head cooler;
means for adjustably supporting said head cooler above a user's head; and
a cooling source, which is communicatively connected with said head cooler, adapted for transferring a cooling air through said head cooler around said user's head so as to substantially cool down a user's head temperature, wherein said cooling source, which is adapted for connecting with an air conditioning system of a vehicle for providing an ambient air therefrom, has a cooling agent compartment for receiving a cooling agent therein and arranged for converting said ambient air into said cooling air via said cooling agent within said cooling agent compartment, wherein said head cooler comprises a dispenser cap and an air conduit extended from said dispenser cap to said cooling source, wherein said dispenser cap has a dispensing cavity for receiving a top portion of said user's head therewithin and a plurality of air meshes spacedly formed on an inner wall of said dispensing cavity for communicating with said air conduit in such a manner that said cooling air is allowed to pass from said cooling source to said dispensing cavity through said air meshes for discharging on said top portion of said user's head, wherein said supporting means comprises a hollow supporting shaft adapted for mounting behind a car seat of said vehicle, wherein said head cooler is suspendedly and movably supported by said supporting shaft at a position above said user's head and arranged in such a manner that said air conduit is extended from said cooling source to the head cooler through said supporting shaft.

7. The mind stimulator, as recited in claim 6, further comprising an ear stimulator adapted to be mounted at a position above said user's head, wherein said ear stimulator comprises a power control supported by said supporting means and two ear stimulating pieces electrically extended from said power control via two retractable wires respectively for detachably mounting on said user's ears respectively in such a manner that each of said ear stimulating pieces is adapted for stimulating a nervous system at said respective ear of said user so as to arouse said user simultaneously.

8. A mind stimulator, comprising:
a head cooler;
means for adjustably supporting said head cooler above a user's head; and
a cooling source, which is communicatively connected with said head cooler adapted for transferring a cooling air through said head cooler around said user's head so as to substantially cool down a user's head temperature, wherein said head cooler comprises a dispenser cap having a dispensing cavity for receiving a top portion of said user's head therewithin, wherein said cooling source has a cooling agent compartment provided at said head cooler for receiving a cooling agent therein so as to cool down air within said dispensing cavity.

9. The mind stimulator, as recited in claim 8, wherein said dispenser cap has an inner conductive layer formed as an inner wall of said dispensing cavity to communicate with said cooling agent compartment and a heat insulation layer enclosed said cooling agent compartment for reducing energy loss of said cooling agent in said cooling agent compartment so as to substantially convert said air within said dispensing cavity into said cooling air through said inner conductive layer.

10. The mind stimulator, as recited in claim 9, further comprising an ear stimulator adapted to be mounted at a position above said user's head, wherein said ear stimulator comprises a power control supported by said supporting means and two ear stimulating pieces electrically extended from said power control via two retractable wires respectively for detachably mounting on said user's ears respectively in such a manner that each of said ear stimulating pieces is adapted for stimulating a nervous system at said respective ear of said user so as to arouse said user simultaneously.

11. The mind stimulator, as recited in claim 10, wherein said supporting means comprises a supporting shaft adapted for mounting behind a car seat of said vehicle, wherein said head cooler is suspendedly and movably supported by said supporting shaft at a position above said user's head.

\* \* \* \* \*